United States Patent [19]

Kobayashi et al.

[11] 3,845,536

[45] Nov. 5, 1974

[54] COVERED WIRE WRAPPING APPARATUS

[75] Inventors: Takashi Kobayashi, Fujisawa; Masaaki Aida, Yokohama; Tooru Mita, Yokohama; Takayuki Nishi, Yokohama, all of Japan

[73] Assignee: Hitachi, Ltd., Tokyo, Japan

[22] Filed: Aug. 15, 1973

[21] Appl. No.: 388,556

[30] Foreign Application Priority Data

Aug. 18, 1972 Japan ............................ 47-82175
Sept. 22, 1972 Japan ............................ 47-94551
Sept. 22, 1972 Japan ............................ 47-94552

[52] U.S. Cl. ............................ 29/203 DT, 29/203 H
[51] Int. Cl. ............................ H01r 43/04
[58] Field of Search ........ 29/203 DT, 203 H, 203 B, 29/203 R

[56] References Cited

UNITED STATES PATENTS 3,122,826 3/1964 Self ............................ 29/203 DT
3,378,906 4/1968 Dorsey ............................ 29/203 H

*Primary Examiner*—Thomas H. Eager
*Attorney, Agent, or Firm*—Craig & Antonelli

[57] ABSTRACT

A covered wire wrapping apparatus comprising a cutting and stripping tool adapted to cut an elongated covered wire into covered wires of a predetermined length and stripping a cover from each end portion of a severed covered wire, a wrapping tool including a plurality of bits, each of said bits adapted to wrap a core wire or conductor of one of end portions of a severed covered wire abut a terminal of an electrical component, and guide means adapted to guide each severed covered wire to the plurality of wrapping bits. Conductors of end portions of servered wire are continuously wrapped about terminals of electrical components while the wires crossing one another, or the wire and the terminal of electrical components crossing one another are insulated. The provision of conductive connection between terminals of electrical components is facilitated and can be carried out quickly.

8 Claims, 14 Drawing Figures

COVERED WIRE WRAPPING APPARATUS

BACKGROUND OF THE INVENTION

This invention relates to a covered wire wrapping apparatus for wrapping conductors of covered wires about terminals of a number of electrical components used with control panels for computers, electronic switch boards and the like for providing conductive connection between the terminals.

Wire wrapping apparatus are known for wrapping wire about terminals of electrical components to provide conductive connection therebetween. However, the difficulty in obtaining an overall compact size and a light weight in a cutting and stripping tool for cutting an elongated covered wire into covered wires of predetermined length and removing covers from end portions of severed covered wires has hitherto recognized. Thus, there has not being available a covered wire wrapping apparatus comprising such cutting and stripping tool in combination as a unit with a tool for lapping conductors (cores) of covered wires about terminals of electrical components.

Thus, conventional wire wrapping apparatus receive a supply of wires of different lengths which are cut by a cutting tool into severed wire which have covers of their end portions removed by a separate striping tool so that such severed wires are wrapped about terminals of electrical components by a wrapping tool. This entails the disadvantages of requiring a space for storing such severed wires for later use and having to perform a troublesome and time-consuming operation of making preparations for lapping them about terminals of electrical components.

Also, wire wrapping apparatus are known for cutting bare portions of elongated bare wires which are covered for insulating purposes with a slidable insulating tube or adhesive tape of various lengths at portions of the bare wire needing insulation, and wrapping severed bare portions about terminals of electrical components so as to effect insulation between the wires which cross one another or between the crossed wires and the terminals of electrical components and at the same time to provide conductive connection between the terminals of electrical components. There are some disadvantages in this type of apparatus. They are low in productivity; it is difficult to commercially obtain such expensive elongated bare wires which are covered with an insulating tube or adhesive tape; and their operation efficiency is low because an insulating tube or adhesive tape used for covering portions of the bare wire tends to move. An added disadvantage is that the insulating tube or adhesive tape may slide on cores when subjected to vibration and dielectric breakdown may occur after the bare wires are wrapped about the terminals of electrical components.

SUMMARY OF THE INVENTION

An object of the invention is to provide a covered wire wrapping apparatus which is effective to cut an elongated covered wire into severed covered wires of a predetermined length and continuously wrap conductors of end portions of the severed covered wires about terminals of electrical components after coveres are removed from such end portions, whereby wires and wires which cross one another or crossed wires and terminals of electrical components can be positively insulated and conductive connection can be readily and quickly provided between the terminals of electrical components.

Another object is to provide a covered wire wrapping apparatus which incorporates therein a miniaturized automatic cutting and stripping tool which is effective to cut an elongated covered wire into severed covered wires and remove covers from end portions of the severed covered wires.

Another object is to provide a covered wire wrapping apparatus which is provided with a feed wire draw-out tool which refrains from drawing out a covered wire when the load applied to the covered wire reaches a predetermined level and the wire slips, so as to thereby preclude bending of the covered wire when it is introduced from the cutting and stripping tool to a lapping tool.

Still another object is to provide a covered wire wrapping apparatus of high efficiency which is effective to continuously wrap a leading end portion and a trailing end portion of a severed covered wire about respective terminals of electrical components after removing covers from such end portions by merely having the bare leading and trailing end portions engaged only one by wire leading end bits and a wire trailing end bit respectively.

Still another object is to provide a covered wire wrapping apparatus which eliminates the need to use guide means of complex structure for guiding a severed covered wire and permits a conductor of an end portion of a severed covered wire to be positively inserted in an eccentric groove of the bit of the wrapping tool in a simple operation.

Still another object is to provide a covered wire wrapping apparatus in which the forward ends of the bits of the wrapping tool are minimized in size so as to thereby facilitate wrapping of conductors of end portions of a severed covered wire about terminals of electrical components.

A further object is to provide a covered wire wrapping apparatus of superb performance in which conductors of end portions of a severed covered wire are each inserted into the interior of one of the bits of the wrapping tool through its forward end before being wrapped about one of the terminals of electrical components, and the leading end portion and the trailing end portion of the covered wire are identical with each other in shape so that the covered wire can be wrapped upwardly on both terminals at all times and can be wrapped to the terminals of electrical components without being twisted.

According to the invention, there is provided a covered wire wrapping apparatus comprising, in combination, a cutting and stripping tool for cutting an elongated covered wire into severed wires of a predetermined length and stripping a cover from each end portion of each severed wire to expose a conductor at each end portion, a wrapping tool comprising a plurality of bits each adapted to wrap the conductor of each end portion of each severed covered wire about a terminal of an electrical components, and guide means for guiding each severed covered wire to the plurality of bits of the wrapping tool from the cutting and stripping tool.

DESCRIPTION OF A PREFERRED EMBODIMENT

Figures 1, 2:
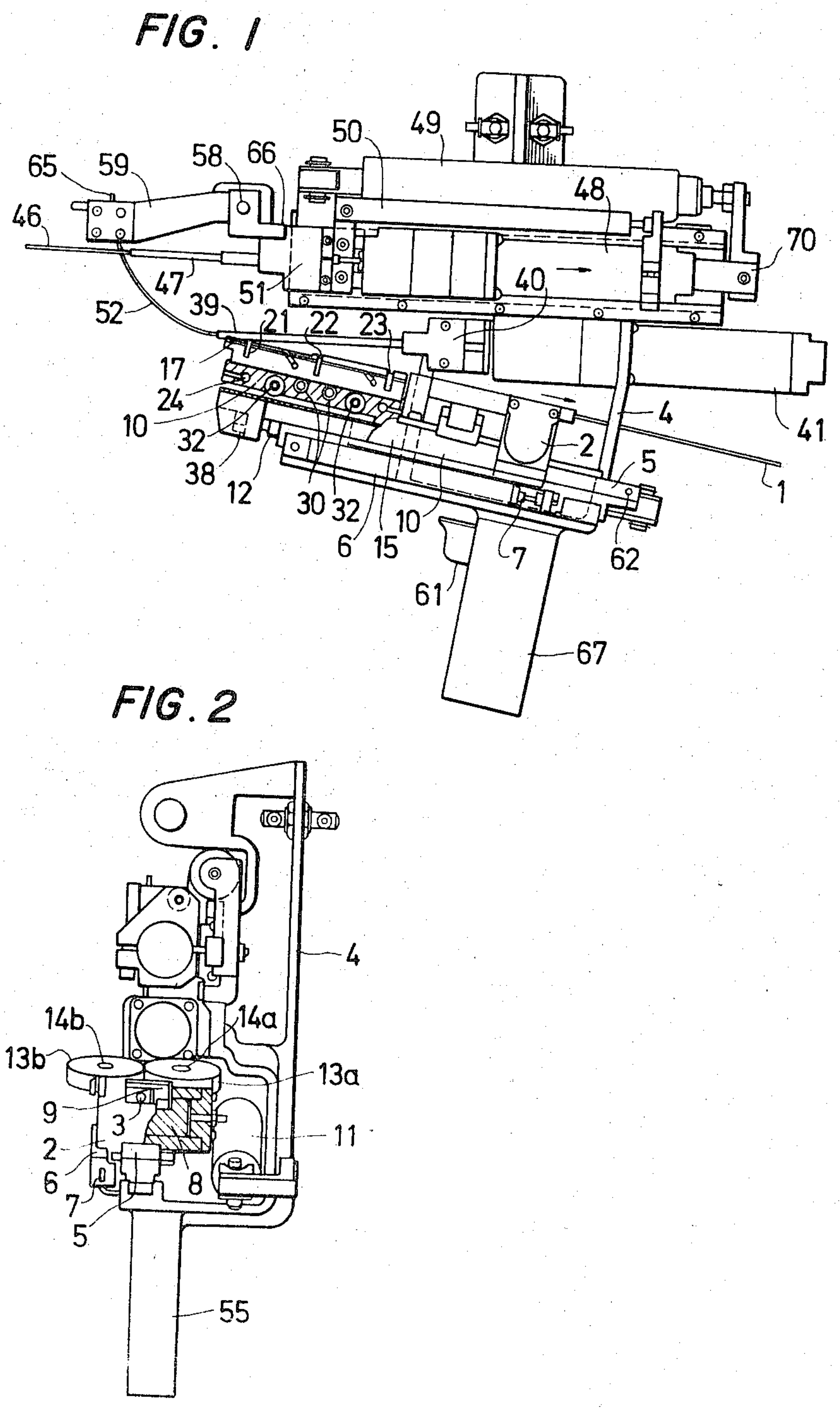
FIG. 1 is a front view of the covered wire wrapping apparatus comprising one embodiment of the invention.
FIG. 2 is a side view of the apparatus shown in FIG. 1.
Figure 3:
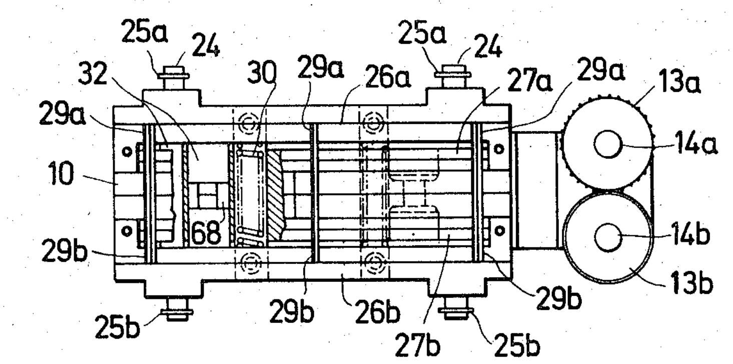
FIG. 3 is a plan view of the cutting and stripping tool incorporated in the covered wire wrapping apparatus shown in FIG. 1.
Figure 5:
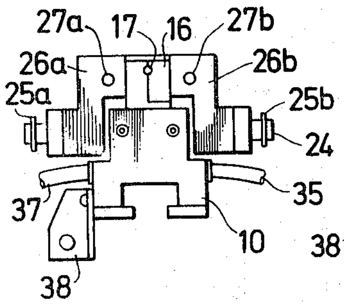
FIG. 5 is a front view of the cutting and stripping tool shown in FIG. 3.
Figure 4:
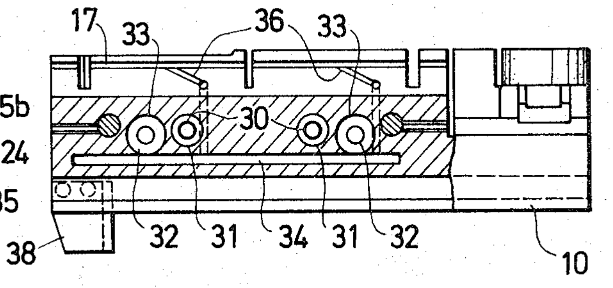
FIG. 4 is a side view of the cutting and stripping tool shown in FIG. 3.

A preferred embodiment will now be described with reference to the drawings. 1 designates a covered wire which is insulated through its entire length. 2 is a covered wire clamp loosely supported for sliding motion on a slide rail 5 attached to a frame 4 and connected to a piston rod 7 received in a cylinder 6 secured to the frame 4. 3 is an aperture member mounted at one end of the covered wire clamp 2 to guide the covered wire 1. The covered wire clamp 2 has disposed in the central portion thereof a fixed gripper element (not shown) attached to the covered wire clamp 2 and a sliding gripper element 9 connected to a cylinder 8, such gripper elements being adapted to grip the covered wire 1 therebetween when the cylinder 8 is rendered operative and to release the covered wire 1 as the sliding gripper element 9 is restored to its original position by the biasing force of a spring (not shown) when the cylinder 8 is rendered inoperative.

10 designates a cutting and stripping block loosely supported for sliding motion on the slide rail 5 attached to the frame 4 and connected through a bracket 38 to a piston rod 12 received in a cylinder 11 secured to the frame 4. **13*a* is a draw-out roller formed on its periphery with trapezoidal irregularities and loosely supported for rotation by a shaft 14a secured to the cutting and stripping block 10. 13*b* is a draw-out roller loosely supported for rotation by a shaft 14*b* and including a resilient material layer provided on its periphery. The draw-out roller 13*b* is resiliently biased toward the drawout roller 13*a* as the shaft 14*b* slides on the cutting and stripping block 10. 15 is a guide attached to the cutting and stripping block 10 and formed therein with an opening for guiding the covered wire 1 therethrough. 17 is a bore formed in the cutting and stripping block 10 and a guide block 16 secured to the block 10 to extend longitudinally therethrough for guiding the covered wire 1**.

21, 22 and 23 are grooves in which cutting blades **18*a*, 18*b*, stripper blades 19*a*, 19*b* and guide blades 20*a*, 20*b* are mounted respectively and which are provided in the guide block 16 and cutting and stripping block 10. 24 designates two shafts each fitted in one of two openings formed in the cutting and stripping block 10 in the indicated positions for loosely supporting one of guide blocks 26*a*, 26*b* disposed on opposite sides of the block 10. 25*a*, 25*b* are stoppers for the guide blocks 26*a*, 26*b* respectively mounted on the shafts 24 as shown. 27*a*, 27*b* are shafts fitted in and attached to bores formed in the guide blocks 26*a*, 26*b* respectively and fixedly fitted in openings 28*a*, 28*b* formed in the cutter blades 18*a*, 18*b*, stripper blades 19*a*, 19*b* and guide blades 20*a*, 20*b* respectively for securing the cutter blades 18*a*, 18*b*, stripper blades 19*a*, 19*b* and guide blades 20*a*, 20*b* to the guide blocks 26*a*, 26*b* together with grooves 29*a*, 29*b* provided in the guide blocks 26*a*, 26*b*** respectively.

30 designates springs for moving the cutter blades **18*a*, 18*b*, stripper blades 19*a*, 19*b* and guide blades 20*a*, 20*b* in the directions of respective cutting edges together with the guide blocks 26*a*, 26*b*, and each inserted in one of bores 31 formed in the cutting and stripping block 10. 32 designates cylinders adapted to move the cutting blades 18*a*, 18*b*, stripper blades 19*a*, 19*b* and guide blades 20*a*, 20*b* in directions opposite to the directions of respective cutting edges together with the guide blocks 26*a*, 26*b* to restore them to their original positions so as to permit the covered wire 1 to move in sliding motion through the longitudinal bore 17. The cylinders 32, which are four in number, are disposed in bores 33 formed in the cutting and stripping block 10 and connected to the guide blocks 26*a*, 26*b* respectively. 34 is a duct formed in the central portion of the cutting and stripping block 10 for connecting an air port 35 to the centers of the cylinders 32. 36 is a duct formed in the cutting and stripping block 10 for connecting a suction port 37 to the longitudinal bore 17**.

Figures 8, 9:
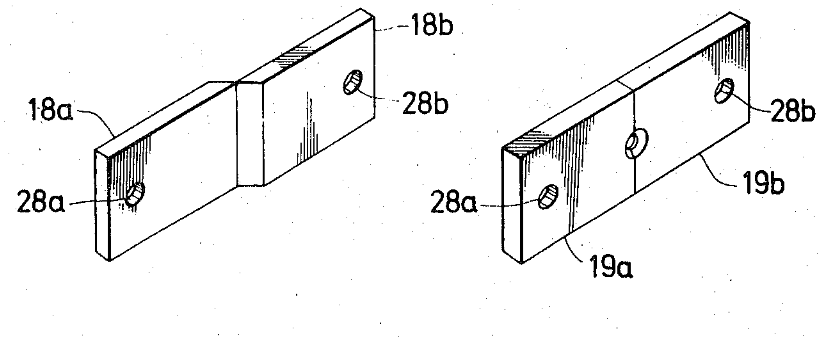
FIG. 8 is a perspective view of the cutter blades.
FIG. 9 is a perspective view of the stripper blades.
Figure 10:
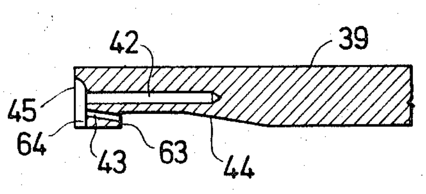
FIG. 10 is a sectional view of the wire trailing end bit, showing its forward end portion.

The cutter blades **18*a*, 18*b* are shaped as shown in FIG. 8. The stripper blades 19*a*, 19*b* are shaped as shown in FIG. 9. As shown in FIG. 1, a wire trailing end bit 39 is rotatably supported by a bearing 40 attached to the frame 4 and connected to a motor 41 secured to the frame 4. In FIG. 10, the wire trailing end bit 39 is shown as being formed at its forward end portion with a terminal receiving hole 42 disposed along the center axis of the bit 39 for receiving therein a terminal of an electrical component, and a wire receiving bore 43 disposed eccentrically with respect to the terminal receiving hole 42 for permitting the covered wire 1 to pass therethrough. A central portion of an outer periphery of the bit 39 is grooved at 44 to provide an angle of relief between the outer periphery of the bit 39 and the cutting and stripping block 10, and at 45 to provide an angle of relief between the front end of the bit 39 and the covered wire 1** when the latter is wrapped about a terminal.

Figure 11:
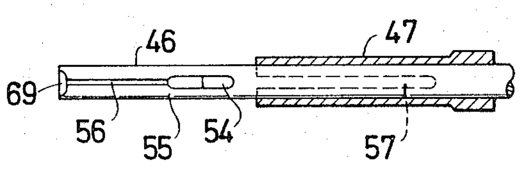
FIG. 11 is a plan view of the wire leading end bit, showing its forward end portion.

46 designates a wire leading end bit (See FIG. 1) telescopically received in a bore of a sleeve as shown in FIG. 11 and connected to an output shaft of a motor 48 FIG. 1. The wire leading end bit 46 is capable of telescopically sliding into the bore of the sleeve 47 and rotating with the sleeve 47 as a unit. 50 is a cylinder connected to the motor 48 and adapted to cooperate with the latter to move the wire leading end bit 46 into the sleeve 47. 49 is a cylinder connected to a slice rail 70 and adapted to move in sliding motion a bearing 51 attached to the slide rail 70 and rotatably supporting the sleeve 47 together with the motor 48 as a unit, the motor 48 being connected to the bit 46.

Figure 12:
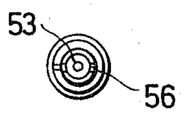
FIG. 12 is a side view of the wire leading end bit shown in FIG. 11.
Figure 13:
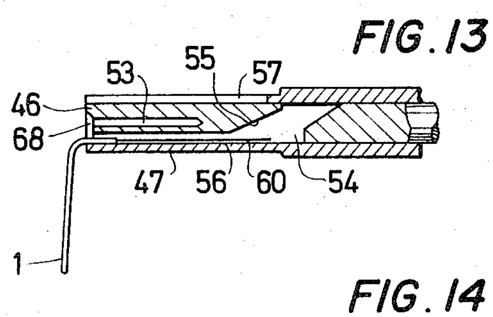
FIG. 13 is a sectional view of the wire leading end bit shown as telescopicaly sliding into the sleeve and having fitted therein a core wire or conductor of an end portion of a covered wire whose cover is removed.

As shown in FIG. 11, FIG. 12 and FIG. 13, the wire leading end bit 46 is formed at its forward end portion with a terminal receiving hole 53 disposed along the center axis of the bit 46 for receiving therein a terminal of an electrical component, a radial opening 54 permitting a wire guide 52 and the covered wire 1 to extend therethrough, an inclined surface 55 for bending the covered wire 1 axially of the bit 46, and a groove 56 disposed axially at the outer periphery of the bit 46 and eccentrically with respect to the terminal receiving hole 53 for positioning the covered wire 1 axially when the bit 46 telescopically slides into the sleeve 47. The front end of the bit 46 is grooved at 69 to provide an angle of relief between the front end of the bit 46 and the covered wire 1 when the latter is wrapped about a terminal of an electrical component. A slit 57 is formed at a front end of the sleeve 47 to keep the covered wire 1 from catching against the sleeve 47 when the former is bent. The wire guide 52 for introducing the covered wire into the radial opening 54 in the wire leading end bit 46 after the wire is drawn out through the longitudinal bore 17 formed in the cutting and stripping block 10 and the wire receiving bore 43 formed in the wire trailing end bit 39 is of an arcuate cylindrical shape and attached to an arm 59 pivotally supported by transverse shaft 58 fixed to the frame 4.

The motor 48 connected to the wire leading end bit 46 is provided with stop means for interrupting the rotation of the wire leading end bit 46 when the opening 54 formed in the bit 46 is oriented vertically to receive the wire guide 52 therein and the groove 56 formed in the bit 46 is disposed in a lower position after the bit 46 is rotated to wrap a core wire 60 of the covered wire 1 about a terminal of an electrical component. The motor 41 connected to the wire trailing end bit 39 is also provided with stop means for interrupting the rotation of the wire trailing end bit 39 when the wire receiving bore 43 in the bit 39 is disposed in a lower position so as to permit the core wire 60 of the covered wire 1 to be introduced into the wire guide 52 through the wire receiving bore 43 from the longitudinal bore 17 in the cutting and stripping block 10, after the core wire 60 of the covered wire 1 is wrapped about a terminal of a electrical component. A handle 67 for manually operating the wrapping tool constructed as aforementioned is provided at the frame 4. Switches for operating the motors and cylinders are also provided at the frame 4.

Figure 6:
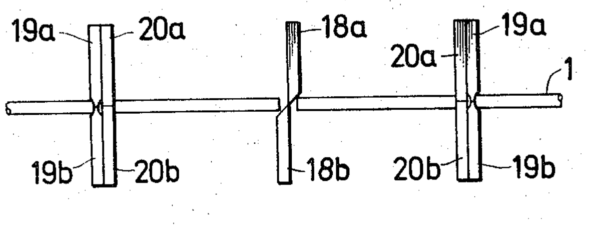
FIG. 6 shows a covered wire cut by cutter blades and having its cover cut by stripper blades.

In operation, the elongated covered wire 1 is inserted in the aperture member 3 mounted on the covered wire clamp 2, moved between the fixed gripper element and the sliding gripper element 9 which are out of engagement with each other, and introduced between the draw-out rollers 13*a* and 13*b*. Since the two draw-out rollers 13*a* and 13*b* are maintained in resilient pressing engagement with each other, the covered wire 1 is further moved through the opening formed in the guide 15 and the axial bore 17 formed in the cutting and stripping block 10 by manually rotating the draw-out roller 13*b* till the leading end of the covered wire 1 reaches the forward end of the bore 17. Rotation of the draw-out roller 13*b* is interrupted and the switch 61 is actuated when the leading end of the covered wire 1 reaches the forward end of the bore 17, so that the cylinder 8 is rendered operative and moves the sliding gripper element 9 into engagement with the fixed gripper element to grip the covered wire 1 therebetween. At the same time, the compressed air contained in an air chamber 68 which has been introduced thereinto through the air port 35 and the duct 34 is removed therefrom to render the cylinder 32 inoperative. This permits the spring 30 to move by its biasing force the cutter blades 18a, 18b and the stripper blades 19*a*, 19*b* toward each other in the directions of the edges of the blades to cut the covered wire 1 by the cutter blades 18*a*, 18*b* and cut the cover of the covered wire 1 by the stripper blades 19*a*, 19*b* as shown in FIG. 6.

Figure 7:
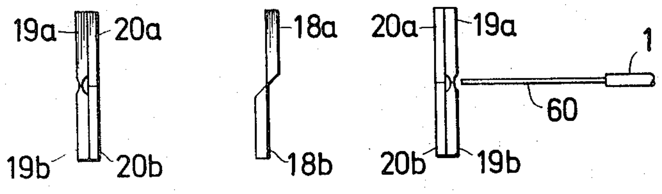
FIG. 7 shows an end portion of the covered wire of FIG. 6 having its cover stripped therefrom by moving the cutter blades and stripper blades from their positions shown in FIG. 6.

Then, the cylinder 11 is rendered operative to cause the cutting and stripping block 10 to move on the slide rail 5 in the direction of an arrow in FIG. 1 while pushing the covered wire clamp 2. The block 10 stops when it strikes a stopper 62 secured to the slide rail 5. Actuation of the switch 61 again renders the cylinder 6 operative so as to hold the covered wire clamp 2 gripping the covered wire in a position in which it engages the stopper 62 at its side. The cylinder 11 is simultaneously rendered operative to move the cutting and stripping block 10 in a direction opposite to the direction indicated by the arrow. Thus, one end portion of the covered wire has its cover removed to expose the core wire 60 as shown in FIG. 7, with the cutting and stripping block 10 being stopped by a stopper in the cylinder 11 in a position in which it is spaced apart with a small clearance from an end surface of the groove for forward end portion 44 of the wire trailing end bit 39. At the same time, a fresh supply of compressed air is delivered through the air port 37 and the duct 36 to the longitudinal bore 17 to remove the cover therefrom.

Then, the arm 59 is manually pivoted to move the wire guide 52 through the radial opening 54 formed in the wire leading end bit 46 till it reaches an end surface 64 of the wire receiving bore 43 formed in the wire trailing end bit 39, so that the wire receiving bore 43 maintains communication with the opening formed in the cylindrical wire guide 52.

Actuation of the switch 58 opens the cylinder 8 for the covered wire clamp 2 so as to thereby release the sliding gripper element 9 from engagement with the fixed gripper element. At the same time, a fresh supply of compressed air is delivered to the air chamber 68 through the air on port 35 and the duct 34 to render the cylinder 32 operative to move the cutter blades 18*a*, 18*b* and the stripper blades 19*a*, 19*b* away from each other in directions opposite to the directions of the edges of the blades, thereby releasing the covered wire 1 from engagement with the blades.

Then, the draw-out roller 13b is manually rotated, to draw-out the covered wire 1 ready for wrapping and move the same through the longitudinal bore 17 in the cutting and stripping block 10, the wire receiving bore 43 in the wire trailing end bit 39 and the opening in the cylindrical wire guide 52, after the cover is removed from the bore 17 by compressed air as aforementioned. Rotation of the draw-out roller 13*b* is interrupted when the leading end of the covered wire 1 reaches a forward end 65 of the wire guide 52, and the arm 59 is manually pivoted clockwise in FIG. 1 till it stops as it strikes a stopper 66 to release the wire guide 52 from engagement in the radial opening 54 formed in the wire leading end bit 46.

Actuation of the switch 61 again renders the cylinder 50 operative to move the motor 48 in the direction of an arrow in FIG. 1 so as to telescopically move the wire leading end bit 46 into the sleeve 47. Thus, a portion of the covered wire 1 of a predetermined length extending upwardly through the radial opening 54 formed in the wire leading end bit 46 is first bent axially along an inclined inner wall 55 of the radial opening 54 in the bit 46 and then fitted in the bore 56 in the bit 46 as shown in FIG. 13.

With the covered wire 1 in this position in the bit 46, the wire leading end bit 46 is fitted over a terminal 71 of an electrical component by inserting the terminal 71 in a terminal receiving hole 53 formed in the bit 46, and the switch 61 is actuated to rotate the wire leading end bit 46 and the sleeve 47 maintained in engagement with the motor 48. This wraps the core wire 60 of the covered wire 1 about the terminal 71 as shown in FIG. 14, thereby terminating a wire wrapping operation.

Thereafter, the wire leading end bit 46 is released from the terminal 71 and switch 61 is actuated to render the cylinder 49 operative to wrap the trailing end portion of the wire 1. More specifically, operation of the cylinder 49 moves the wire leading end bit 46 and sleeve 47 in engagement with the motor 48 and bearing 66 in the direction of the arrow till the movement is interrupted by a stopper in the cylinder 49. Then, the wire covered wrapping apparatus tool is moved and the wire trailing end bit 39 is fitted over a terminal of the electrical component at the terminating end of the wire by slightly inserting the terminal in the terminal receiving hole 42 in the bit 39 while the covered wire 1 is drawn out through the wire receiving bore 43 in the bit 39. Thus, positioning the wrapping tool is effected and the length of the covered wire 1 from the terminal of the electrical component about which the wire has been wrapped previously to the terminal of the electrical component on the termination side of the wire 1 is set at a desired level. Then, the draw-out roller 13*b* is manually rotated to render the wire 1 taut and the switch 61 is actuated to remove the compressed air from the air chamber 68 through the air port 35 and duct 34. This renders the cylinder 32 inoperative and permits the cutter blades 18*a*, 18*b* and stripper blades 19*a*, 19*b* to be moved toward each other in the directions of the edges of the blades by the biasing force of the spring 30, so that the cutter blades 18*a*, 18*b* cut the covered wire 1 and the stripper blades 19*a*, 19*b* cut the cover of the covered wire 1.

The cylinder 8 for the covered wire clamp 2 is rendered operative to cause the latter to grip the covered wire 1, and at the same time the cylinder 11 is rendered operative to move the cutting and stripping block 10 together with the covered wire clamp 2 in the direction of an arrow to strip a cover from trailing end portion of the covered wire to expose the core wire 60 at the trailing end portion of the wire 1. At this time, a fresh supply of compressed air is delivered to the longitudinal bore 17 through the air port 37 and duct 36 to remove the cover therefrom.

Figure 14:
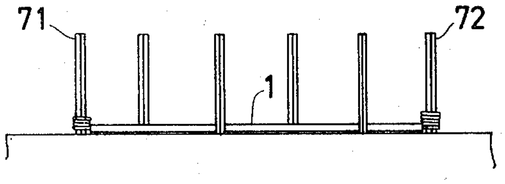
FIG. 14 shows core wires or conductors of end portions of a covered wire wrapped to terminals of an electrical component by the covered wire wrapping apparatus according to the invention.

Then the wire trailing end bit 39 is fitted over a terminal 72 of an electrical component by inserting the former into the terminal receiving hole 42 in the latter to a predetermined depth, and the switch 61 is actuated to rotate the wire trailing end bit 39 which is in engagement with the motor 41 so as to thereby wrap the core wire 60 at the trailing end portion of the covered wire 1 about the terminal 72 of the electrical component as shown in FIG. 14, thereby completing the operation of providing conductive connection between one terminal of an electrical component and another terminal thereof.

Thereafter, the wire covered wrapping apparatus is removed from the terminal of the electrical component and the switch 61 is actuated to render the cylinder 6 operative as aforementioned, so that the covered wire 1 is maintained in the aforementioned position. The cylinder 11 is also rendered operative to move the cutting and stripping block 10 in a direction opposite to the direction of the arrow, at the same time the cylinder 49 is rendered operative to move the motor 48 and bearing 51 together in a direction opposite to the direction of the arrow, and at the same time the cylinder 50 is rendered operative to move the motor 48 in a direction opposite to the direction of the arrow to cause the wire leading end bit 46 to slide out of the sleeve 47 to be ready for the next wire wrapping operation.

Various cylinders and switches have been described as being intermittently rendered operative as the switch is actuated. In actual pactice, however, control means is provided between the switch 61 and each cylinder and the associated motor, and actuation of the switch 61 renders each control means operative to actuate respective cylinder and motor.

From the foregoing description, it will be appreciated that the present invention offers many advantages. According to the invention, a cutting and stripping tool for cutting a covered wire and removing a cover from each end portion thereof and means for introducing the covered wire to a wrapping tool, which are formed as a unit, are compact in size and light in weight, so that they can be combined with a wrapping tool including bits for wrapping the covered wire about terminals of an electrical component to provide a covered wire wrapping apparatus of high efficiency. Such wrapping apparatus permits an elongated covered wire to be cut continuously into severed covered wires of a predetermined length and permits a core wire of an end portion of each such severed covered wire to be wrapped about each terminal of an electrical component after a cover is stripped from each end portion. Furthermore, the apparatus permits the core wire of the severed covered wire to be continuously wrapped about the terminals of the electrical component with ease even if the distance between the terminals to be conductively connected varies from one electrical component to another.

The covered wire used with the wrapping apparatus according to the invention consists of a core wire sheathed with a cover and is readily available commercially at low cost. It is highly insulating at points of intersection of wires or wire and terminal, so that the operation of providing conductive connection between terminals of electrical components by wrapping the covered wire about the terminals can be performed with a high degree of efficiency.

The covered wire wrapping tool of the covered wire wrapping apparatus according to the invention comprises a plurality of bits each being formed at its front end portion with a terminal receiving hole disposed along the center axis of each bit and a bore disposed eccentrically with respect to the terminal receiving hole for inserting a wire therein, each such bit being adapted to be rotated from a power source to wrap the wire about a terminal. This arrangement permits one end portion of a wire fitted in the eccentric bore formed in one bit to be wrapped about one terminal of an electrical component while the other end portion of the wire is being fitted in the eccentric bore formed in the other bit. The arrangement also permits end portions of a wire to be fitted at a time in the eccentric bores formed in the plurality of bits and wrapped about respective terminals of an electrical component by rotating the bits. Thus, the apparatus according to the invention permits insertion of end portions of a wire in the eccentric bores in the bits and wrapping of the end portions of the wire about the terminals to be carried out continuously, thereby enabling a wiring operation to be performed with a high degree of efficiency.

Also the covered wire wrapping apparatus according to the invention can perform a wire wrapping operation automatically by providing wire supply means which automatically supplies a feed of wire continuously to the eccentric bores formed in the bits, because the invention permits a wire to be fed perpendicularly to the axis of the bit in fitting the wire in the eccentric bore formed in each bit.

The wire is not twisted when the bits according to the invention are used for wrapping wires about terminals of an electrical component, so that conductivity of the wire lapped about the terminals is greatly increased. The wire wrapped about each terminal extends upwardly on both of the terminals according to the invention, so that a space required for wiring between the terminals will be reduced.

While a preferred embodiment of the invention has been shown and described, it is to be understood that the invention is not limited to the specific form of the apparatus and that many changes and modifications may be made therein without departing from the spirit and scope of the invention.

What we claim is:

1. A covered wire wrapping apparatus comprising, in combination, a cutting and stripping tool for cutting an elongated covered wire into severed covered wires of a predetermined length and stripping a cover from the end portion of said severed covered wire to expose a conductor at the end portion of said severed covered wire, a wrapping tool comprising a bit adapted to wrap the conductor at the end portion of said severed covered wire about one terminal of an electrical component, and guide means for guiding said severed covered wire to lead to said bit of said wrapping tool from said cutting and stripping tool.

2. A covered wire wrapping apparatus according to claim 1, characterized by, in combination, a cutting and stripping tool including a cutter blades and stripper blades disposed in juxtaposed relationship along a longitudinal bore for guiding an elongated covered wire leading therethrough, and cutter blades and stripper blades being moved by the biasing force of a resilient member in one direction and being moved in the opposite direction by a cylinder or plunger magnet operating against the biasing force of said resilient member.

3. A covered wire wrapping apparatus according to claim 1 further comprising a draw-out means including a draw-out roller formed on its outer periphery with a resilient material layer, and another draw-out roller formed on its outer periphery with an irregular surface, said two draw-out rollers being adapted to be brought into pressing engagement with each other at their outer peripheries by the biasing force of a spring, a covered wire held between said two draw-out rollers being adapted to slip when a load of a predetermined level is applied to the wire.

4. A covered wire wrapping tool comprising, in combination, cutting and stripping tool for cutting an elongated covered wire into severed covered wires of a predetermined length and stripping a cover from each end portion of each said severed covered wire to expose a conductor at each said end portion of each said severed covered wire, a wrapping tool including a wire leading end bit adapted to wrap about a terminal of an electrical component a conductor of a leading end portion of one of said severed covered wire of a predetermined length supplied from said cutting and stripping tool, and a wire trailing end bit adapted to wrap about a terminal of another electrical component a conductor of a trailing end portion of said one severed covered wire of a predetermined length, and guide means introducing into said wire leading end bit of said wrapping tool a severed covered wire of a predetermined length supplied from said cutting and stripping tool through an eccentric bore formed in wire trailing end bit.

5. In a covered wire wrapping apparatus, a wrapping tool comprising a bit formed therein with a hole extending from a forward end of the bit along the center axis thereof for receiving therein a terminal of an electrical component, an axial groove extending from the forward end of the bit and disposed eccentrically with respect to said terminal receiving hole at an outer periphery of the bit, and an opening extending radially of the bit from the other end of said eccentric groove, and a cylindrical sleeve receiving therein said bit for telescopically sliding into and out thereof, said bit being rotated where a conductor at an end portion of a wire inserted into said radial opening is fitted in said eccentric groove by the action of said sleeve, whereby the conductor at the end portion of the wire can be wrapped about a terminal of an electrical component.

6. A covered wire wrapping apparatus comprising, in combination, a cutting and stripping tool for cutting an elongated covered wire into severed covered wires of a predetermined length and stripping a cover from each end portion of each said severed covered wire to expose a conductor at each said end portion of each said severed covered wire, a wrapping tool comprising a wire leading and bit and a wire trailing end bit, said wire leading end bit being formed therein with a hole extending from a forward end of the bit along the center axis thereof for receiving therein a terminal of an electrical component, an axial groove extending from the forward end of the bit and disposed eccentrically with respect to said terminal receiving hole at an outer periphery of the bit, and an opening extending radially of the bit from the other end of said eccentric groove, said bit being received in a cylindrical sleeve and adapted to telescopically slide into and out thereof, a conductor of a leading end portion of a wire supplied from said cutting and stripping tool being inserted in said radial opening, then the bit being moved axially so as to fit the conductor into the eccentric groove by the action of the sleeve, and thereafter the bit being rotated whereby the conductor at the leading end portion of the wire can be wrapped about a terminal of an electrical component, said wire trailing end bit being formed therein with a hole extending from a forward end of the bit along the center axis thereof for receiving therein a terminal of an electrical component; and an axial bore extending from the forward end of the bit to a relief groove formed in a central portion of an outer periphery of the bit and disposed eccentrically with respect to said terminal receiving hole, said wire trailing end bit being adapted to wrap about a terminal of an electrical component a conductor at a trailing end portion of the wire of a predetermined length inserted in said eccentric bore, and guide means including a cylindrical guide adapted to introduce into said radial opening formed in said wire leading end bit of said wrapping tool a covered wire of a predetermined length supplied from said cutting and stripping tool and moved through said eccentric bore formed in said wire trailing end bit, said cylindrical guide being rotatable and adapted to move through said radial opening in said wire leading end bit.

7. In a covered wire wrapping apparatus, a wrapping tool comprising a bit formed therein with a hole extending from a forward end of the bit along the center axis thereof for receiving therein a terminal of an electrical component, and an axial bore extending from the forward end of the bit to a relief groove formed in a central portion of an outer periphery of the bit and disposed eccentrically with respect to the terminal receiving hole, and a cutting and stripping tool adapted to set at a predetermined length, a covered wire inserted in said eccentric axial bore in said bit and stripping a cover from an end portion of the covered wire to expose a conductor, said bit being adapted to wrap the conductor at the end portion of the covered wire when the bit rotates.

8. A covered wire wrapping tool according to claim 3 wherein a forward end of the wire leading end bit is moved rearwardly of a forward end of the wire trailing end bit when the wire trailing end bit is used for wrapping a conductor at a trailing end portion of a covered wire about a terminal of an electrical component.

* * * * *